Figure 1:
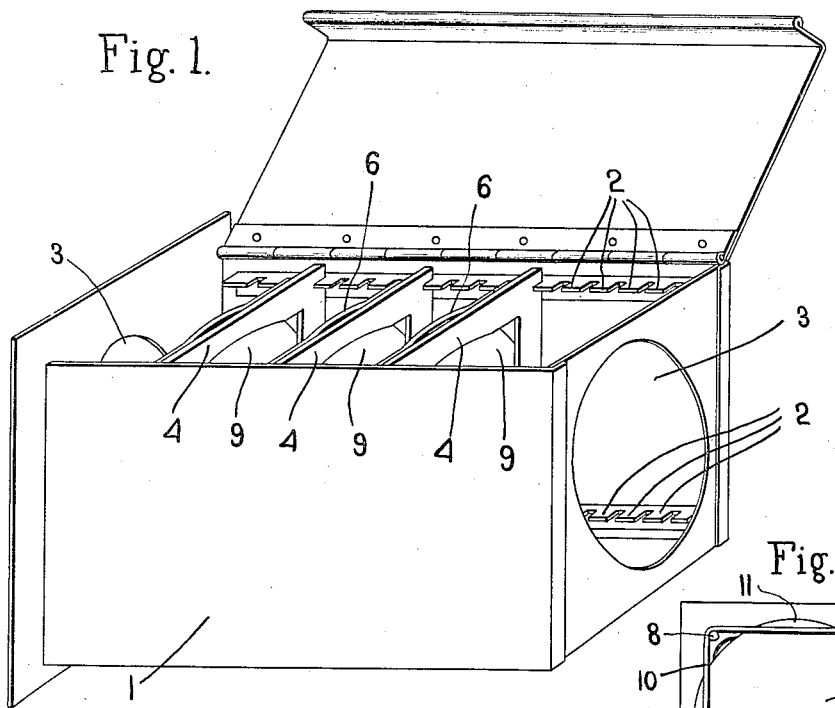

O. B. DEPUE.
LENS HOLDER.
APPLICATION FILED DEC. 18, 1913.

1,118,187.

Patented Nov. 24, 1914.

Witnesses.
J. Morrill Fuller
William E. Gagen

Inventor.
Oscar B. Depue,
by Heard Smith & Tennant.
Atty's.

UNITED STATES PATENT OFFICE.

OSCAR B. DEPUE, OF CHICAGO, ILLINOIS, ASSIGNOR OF ONE-HALF TO EMORY W. GOODRICH, OF SOMERVILLE, MASSACHUSETTS.

LENS-HOLDER.

1,118,187.      Specification of Letters Patent.      Patented Nov. 24, 1914.

Application filed December 18, 1913. Serial No. 807,536.

*To all whom it may concern:*

Be it known that I, OSCAR B. DEPUE, a citizen of the United States, residing at Chicago, county of Cook, State of Illinois, have invented an Improvement in Lens-Holders, of which the following description, in connection with the accompanying drawing, is a specification, like characters on the drawing representing like parts.

This invention relates to lens holders such as are used for holding in position the lenses in projecting apparatus, and the object of the invention is to provide a novel lens holder which can be inexpensively manufactured and which will obviate the danger of breakage of the lens due to the uneven expansion and contraction between the lenses and the holder.

The invention is capable of use with any type of projecting apparatus and is adapted for holding in position any of the lenses used in such apparatus.

In the use of projecting apparatus those lenses which are adjacent the sources of illumination often become quite heated as the lens and its holder are made of material which expands and contracts unequally. Such unequal expansion often results in breaking or cracking the lens. As stated above, my invention is designed to avoid this difficulty.

In order to give an understanding of my invention I have shown in the drawing a selected embodiment of the invention which will now be described, after which the novel features of the invention will be pointed out in the appended claims.

Figure 2:
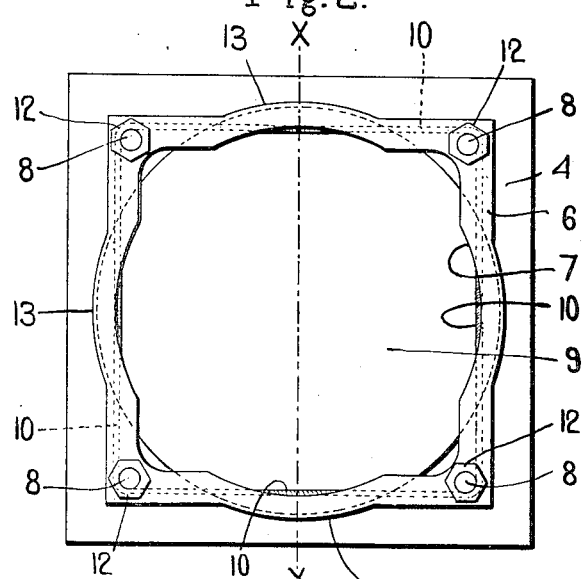
Figure 4:
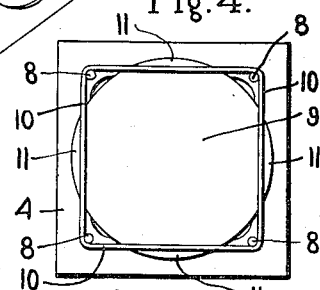
Figure 3:
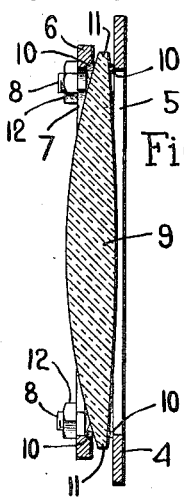

In the drawings, Figure 1 is a perspective view of the box or casing containing the lenses and which forms part of a projecting apparatus, the projecting apparatus not being shown herein; Fig. 2 is a side view of one of the lens holders with a lens therein; Fig. 3 is a sectional view on the line $x$—$x$, Fig. 2; Fig. 4 is a view showing the lens holder with the clamping member removed.

In projecting apparatus the condensing lens, projective lens, and other lenses of the apparatus are usually formed by combining a plurality of separate lenses of different shape and curvature, which separate lenses are mounted in a casing or holder. I have shown such a casing or holder at 1 and have provided it with positioning fingers 2 at either side and at both top and bottom by which the separate lenses of the system are properly positioned and spaced from each other. This casing 1 has an aperture 3 at each end through which the beam of light passes.

Each of the different lenses of the combination of lenses is sustained in a separate lens holder which can be set into the box between the fingers 2 and held in proper position therein. Each lens holder is so made as to hold the lens rigidly in place without any danger that the lens will become broken by the expansion and contraction of the lens or its holder. As herein shown each lens holder comprises a main or body member 4 in the form of a plate having an opening 5 therein through which the beam of light passes, and a clamping member 6 between which and the body member the lens is clamped, said clamping member 6 also having an opening 7 therein which is in alinement with the opening 5. The body member is shown as provided with a plurality of studs 8 extending therefrom which are situated adjacent the periphery of the aperture 5, there being four such studs in this embodiment of my invention. The lens 9 is received within the studs 8 and said lens is of such a size that lines drawn from one stud 8 to the next adjacent stud will intersect the lens. In other words, separated peripheral portions 11 of the lens project beyond the lines connecting the adjacent studs 8. Situated on each side of the lens and between the latter and the holder 4 and the clamping member 6 is a cord like member 10 of yielding material which is also preferably non-combustible. An asbestos cord will answer the desired purpose. Each of these cords 10 encircles the studs 8 and where there are four studs, as shown, each cord when in position assumes a rectangular outline with the sides of each rectangular outline overlying a peripheral portion 11 of the lens.

The clamping member 6 is clamped against the lens by any suitable means. As herein shown the studs 8 are screw-threaded and pass through apertures in the clamping member 6, and clamping nuts 12 are applied to the projecting ends of the studs for clamping the parts firmly together. With this construction it will be noted that the portions of the cords 10 between the posts or studs 8 overlie the peripheral portions 11 of the lens 9 and are interposed between such portions of the lens and the plate 4 and clamping member 6. In other words, the lens is held at four separated points near its periphery between the portions of the two cords 10, which portions of the cord extend transversely across the lens. Since the lens is thus held at four separated points between yielding members, it is possible for the lens to expand or contract independently of the holder and vice versa, and the cords 10 will give during such expansion or contraction, thus allowing sufficient relative movement between the lens and its holder to prevent any cracking or breakage due to uneven expansion.

The invention is simple and easy to manufacture and can be applied to any projecting apparatus now in common use.

While I have illustrated a selected embodiment of my invention, I do not wish to be limited to the constructional features shown.

I have shown the clamping member 6 as formed with the outwardly-curved or bulged portion 13 on each side, the purpose of these portions being to cover and protect the peripheral portions 11 of the lens.

Having fully described my invention, what I claim as new and desire to secure by Letters Patent is:—

1. In a lens holder, the combination with a body member having an aperture and a plurality of studs projecting therefrom, of a clamping member, a lens confined between said members, and two cords of yielding material encircling said studs and between which separated peripheral portions of the lens are received.

2. In a lens holder, the combination with a body member and a clamping member, one of said members having studs extending through the other member, a lens confined between said members within the studs, and two cords of yielding material encircling the studs on either side of the lens, the portion of each cord extending between adjacent studs passing across and having contact with a peripheral portion of the lens whereby the lens is held at separated points on its periphery between said cords.

In testimony whereof, I have signed my name to this specification, in the presence of two subscribing witnesses.

OSCAR B. DEPUE.

Witnesses:
Geo. Fales Baker,
F. V. Banecoffor.